United States Patent [19]
Cloeren

[11] Patent Number: 4,839,131
[45] Date of Patent: Jun. 13, 1989

[54] LAYER WIDTH CONTROL

[75] Inventor: Peter F. Cloeren, Orange, Tex.

[73] Assignee: P.C.E. Corp., Orange, Tex.

[21] Appl. No.: 91,503

[22] Filed: Sep. 3, 1987

[51] Int. Cl.[4] .............................................. B29C 47/92
[52] U.S. Cl. ................................... 264/171; 264/40.7; 425/131.1; 425/133.5; 425/192 R; 425/462
[58] Field of Search .......................... 264/171, 40.7; 425/131.1, 133.1, 133.5, 462–466, 382 R, 192 R

[56] References Cited

U.S. PATENT DOCUMENTS

| | | | |
|---|---|---|---|
| 3,398,431 | 8/1968 | Corbett | 425/133.5 |
| 3,583,032 | 6/1971 | Stafford | 425/133.5 |
| 4,165,210 | 8/1979 | Corbett | 425/133.5 |
| 4,197,069 | 4/1980 | Cloeren | 425/133.5 |
| 4,289,560 | 9/1981 | Simons | 425/133.5 |
| 4,731,004 | 3/1988 | Wenz, Jr. | 425/462 |

FOREIGN PATENT DOCUMENTS

| | | | |
|---|---|---|---|
| 2550553 | 5/1977 | Fed. Rep. of Germany | 264/171 |
| 3010691 | 9/1981 | Fed. Rep. of Germany | 264/171 |
| 55-28887 | 2/1980 | Japan | 264/171 |
| 61-89823 | 5/1986 | Japan | 425/131.1 |
| 651974 | 3/1979 | U.S.S.R. | 425/131.1 |

*Primary Examiner*—Jeffery Thurlow
*Attorney, Agent, or Firm*—Timothy R. Kroboth

[57] ABSTRACT

The present invention provides a novel coextrusion apparatus that includes a first flow channel of a greater width than a second flow channel, and an adjustable vane blade between the channels. By the use of interchangeable plates, this unique apparatus is able to prevent any selected layer or layers of a laminate from extending to the full laminate width. This highly advantageous result is obtained by the formation of an isolating edge that is an integral part of a layer or layers that extend the full laminate width. Also provided is process for forming a laminate having an isolating edge.

15 Claims, 8 Drawing Sheets fig. 1.

LAYER WIDTH CONTROL

TECHNICAL FIELD

This invention relates to coextrusion, in particular the coextrusion of thermoplastic materials.

Background Art

U.S. Pat. No. 4,144,011 to Sponaugle pertains to a feedblock and die assembly which includes beveled plates that form flow channel walls.

As illustrated by U.S. Pat. No. 4,197,069 to Cloeren, an extrusion apparatus having a pivotably mounted, adjustable vane blade between a pair of flow channels, is known. By adjustment of flow channel width through radial movement of a point end of the vane blade, the apparatus provides for stream convergence at substantially equal flow velocities. Each layer of a laminate made by the apparatus, extends the full laminate width.

However, it is desirable to be able to produce a laminate in which a selected layer or layers extend less than the full width of the laminate. For instance, it may be necessary as a result of a drawdown effect, to trim the edges of a laminate. Thus, when a laminate includes a layer or layers of an expensive material or of a material that would adversely affect recyclability, it would be economically beneficial for that particular layer to extend less than the full laminate width, so that trimming would not remove that material.

Isolation of the ends of a core stream from the edges of a laminate may be achieved by encapsulation or sandwiching. U.S. Pat. Nos. 3,397,428 to Donald, 3,479,425 to Lefevre et al, and 3,860,372 to Newman, Jr. illustrate encapsulation of a core stream. A feedblock that includes a removable die rigidly mounted between a pair of channels, exemplifies a coextrusion apparatus useful for sandwiching a core stream. However, neither encapsulation nor sandwiching is able to produce a laminate in which any selected layer, for instance, a skin layer, extends less than the full laminate width.

Also known, as illustrated by U.S. Pat. No. 4,533,510 to Nissel, is an edge-laminating apparatus. However, use of this type of apparatus disadvantageously requires a two step process, with edge-lamination being the second step.

Japanese Patent Document No. 55/28825 exemplifies a multimanifold die in which a selected manifold or manifolds may be partially dammed, to prevent the ends of a skin or core layer from extending the full laminate width. However, this type of extrusion apparatus lacks the advantages of the extrusion apparatus of U.S. Pat. No. 4,179,069 to Cloeren, and requires the interchange of parts to adjust an edge width.

From the foregoing, it can be understood that there is a need for an improved coextrusion apparatus that could produce a laminate in which any selected layer or layers extend less than the full width of the laminate. Such an apparatus would provide an even greater contribution to the art if it made it easy to adjust the distance of the ends of the selected layer or layers from the laminate edges. Such an apparatus would make possible an improved coextrusion process. Moreover, such a coextrusion apparatus would make possible novel, heretofore unobtainable, composite structures.

DISCLOSURE OF THE INVENTION

It is accordingly an object of the present invention to provide an improved coextrusion apparatus that prevents any selected layer or layers from extending to the laminate edge.

It is a further object of the present invention to provide an improved coextrusion apparatus that provides for facile adjustment of the distance of the ends of a selected layer or layers, from the laminate edges.

It is an even further object to provide an improved coextrusion process.

It is a still further object to provide novel laminate structures.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an improved coextrusion apparatus. The apparatus includes a first flow channel having a width equal to that of a combined flow passage formed by the convergence of the first flow channel and a second flow channel. Separating the first flow channel and second flow channel is an adjustable vane blade having a width less than that of the first flow channel. The apparatus further includes a retention plate for limiting the second flow channel to a width less than that of the first flow channel. The result is a laminate having an isolating edge.

Also provided is a unique process for forming a laminate. In the process, a first stream is allowed to flow to a certain width, and a second stream is permitted to flow to a lesser width. The first stream and second stream are thereafter converged upstream of a place of convergence at which the laminate is formed. As a result, the flow of the first stream limits the widthwise flow of the second stream, and the first stream forms an isolating edge that prevents the second stream from extending to the full laminate width.

In addition, there is provided a novel process for adjusting the width of an isolating edge. In the process, the relative back pressures in adjacent flow channels are adjusted by the movement of an adjustable vane blade separating the adjacent flow channels. Thereafter, a first stream is allowed to flow to a certain width in one of the channels, and a second stream is permitted to flow to a lesser width in the other channel. Then the first stream and second stream are converged, as a result of which the flow of the first stream limits the widthwise flow of the second stream. By the process, a laminate having an isolating edge of a selected width is formed.

Additionally, unique coextruded composite structures are provided by this invention. One such composite structure includes a first layer, a second layer, a third layer, and an isolating edge that limits the first layer and third layer widths to less than the full laminate width. The isolating edge is formed by and integral with the second layer, which is disposed between the first and third layers.

Another such composite structure includes a first layer, a second layer and a third layer, as before. However, in this structure, an isolating edge limits the second layer and third layer widths to less than the full composite width. The isolating edge is formed by and integral with the first layer.

A third such composite structure includes a first layer, a second layer, a third layer, a fourth layer, a fifth layer, and an isolating edge that prevents the first, third and fifth layers from extending to the full composite width. The isolating edge is formed by and integral with the second and fourth layers. The second and fourth layers are disposed between the first and third layers, and between the third and fifth layers, respectively.

Yet another such composite structure includes a first layer, a second layer, a third layer, a fourth layer and a fifth layer, as before. However, in this structure, an isolating edge prevents the second, third and fourth layers from extending to the full composite width. The isolating edge is formed by and integral with the first and fifth layers.

In the drawing and in the detailed description of the invention that follows, there are shown and essentially described only preferred embodiments of this invention, simply by way of illustration of the best mode contemplated by me of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an improved coextrusion apparatus in accordance with the present invention.

BEST MODE FOR CARRYING OUT THE INVENTION

As explained earlier, the present invention is directed to an improved coextrusion apparatus and process, and to novel coextruded composite structures. Synthetic resins or liquid crystalline polymers may be used in the invention. Streams converging to form a laminate, may be of substantially equal or dissimilar viscosities. However, for ease of understanding, the foregoing drawing and nearly all of the following description, pertain to the use of materials of substantially equal viscosities. Also, for simplicity, the following description assumes equal flow channel throughput.

Figure 1:
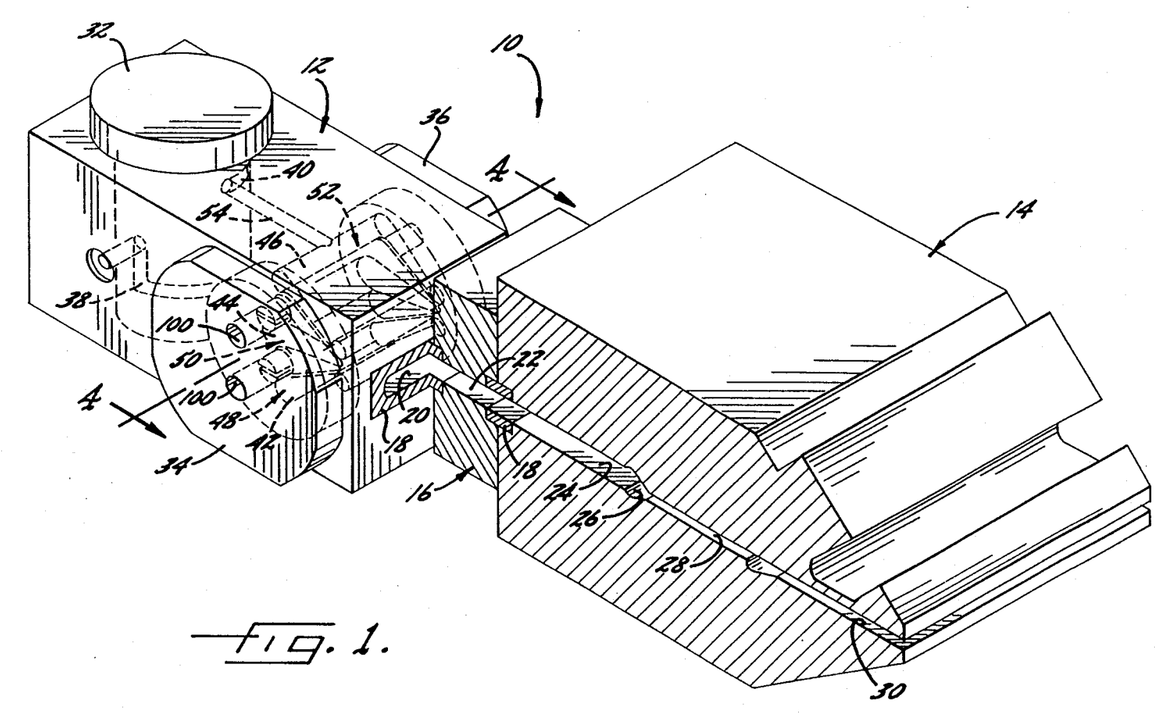
FIG. 1 is a perspective view of a first embodiment of a coextrusion apparatus 10 in accordance with the present invention, with a single manifold die 14 and a die plate 16 of the apparatus shown in cross-section.

Referring to FIG. 1, a first embodiment of a preferred coextrusion apparatus 10 in accordance with the present invention is shown. Apparatus 10 includes a feedblock 12, a single manifold die 14, and a die plate 16, which connects the feedblock to the die. Conventional seals 18 are located at the feedblock/die plate and die plate/die junctures.

An exit channel 20 of the feedblock connects through a channel 22 of the die plate, with an input channel 24 of the die. The width and height of the die input channel and of the die plate channel, are beneficially the same as the width and height of the feedblock exit channel.

In a manifold 26 of die 14, transverse flow of a composite stream occurs. Thereafter, the transversely spread stream passes through a preland channel 28, and then a land channel 30 as it exits from the die.

With continued reference to FIG. 1, feedblock 12 includes a flow selector plug 32 and housing plugs 34,36. The selector plug includes channels 38,40, which along with a third channel (not shown), feed manifolds 42,44,46 of flow channels 48,50,52, respectively, through connecting channels. Transverse flow of a stream occurs in a manifold.

Figures 2, 3:
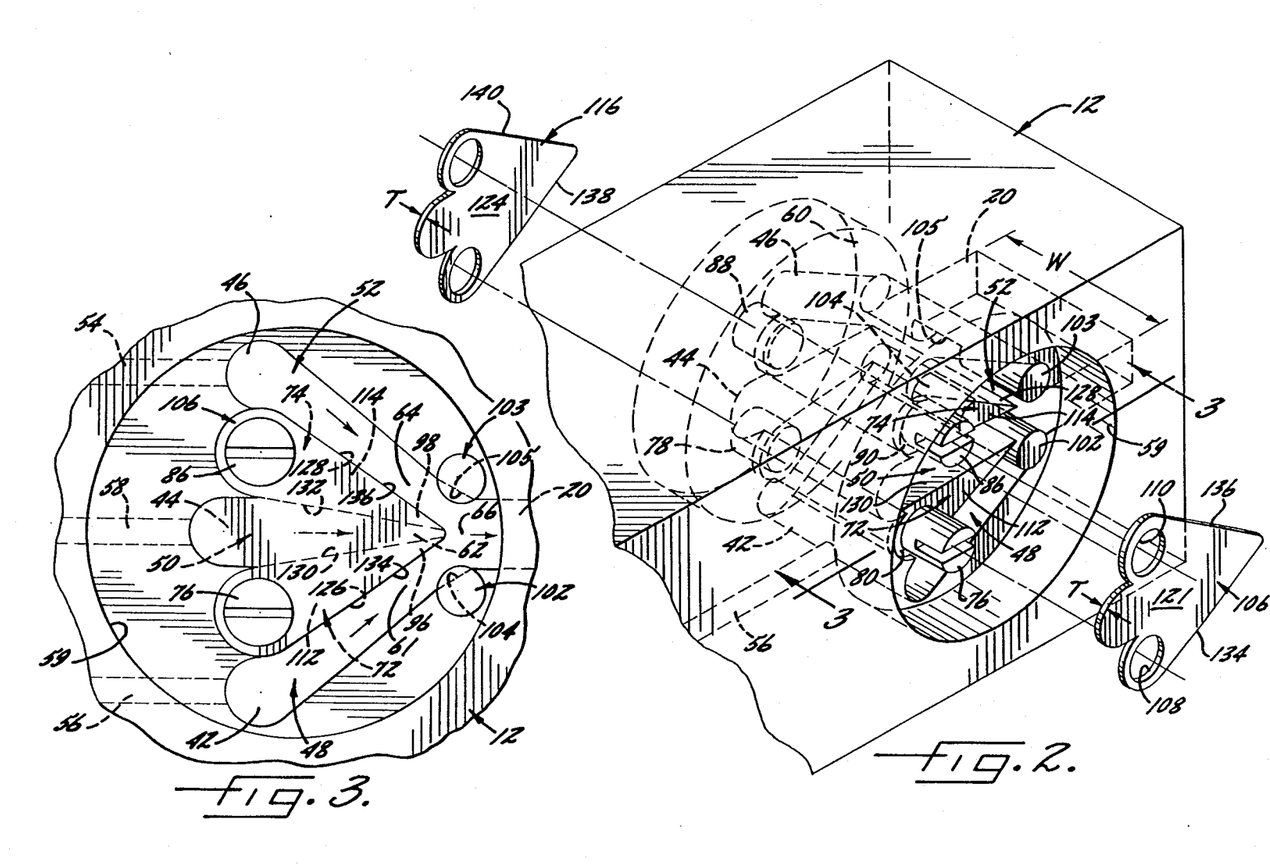
FIG. 2 is an enlarged, exploded, perspective view of a portion of a feedblock 12 of the coextrusion apparatus of FIG. 1, with the housing plugs not shown.
FIG. 3 is an enlarged plan view taken substantially along line 3—3 of FIG. 2, with retention plates (only one.shown) in place.

A connecting channel 54 is shown between channel 40 and manifold 46. However, for simplicity, not all connecting channels are shown in this Figure or in FIG. 2. FIG. 3 depicts a connecting channel 56 to manifold 42, and a connecting channel 58 to manifold 44.

Referring to FIG. 2, it can be seen that feedblock 12 includes recesses 59,60 for housing plugs 34,36, and that removal of the housing plugs exposes internal flow channels.

With reference to FIG. 3, each flow channel includes a flow-restriction channel 61,62,64, as shown. The diminished cross-section of a restriction channel vis-a-vis its manifold, restricts flow from the manifold to combined flow passage 20. The restriction channels are tapered in the direction of flow.

At a locus of convergence 66, flow channels 48,50,52 converge to form combined flow passage or exit channel 20. Passage 20 has a width W, shown in FIGS. 2 and 5. Typically, in the case of a feedblock, this width is 4".

Figure 4:
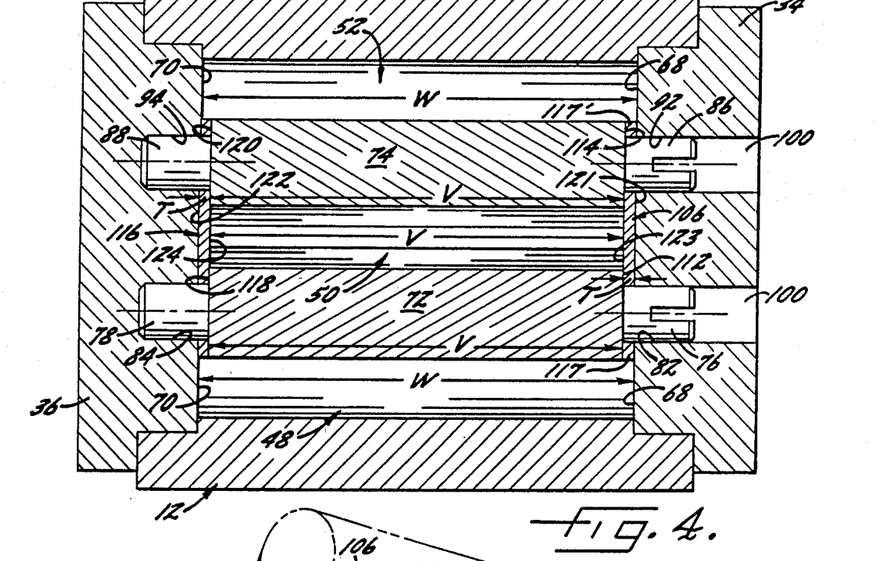
FIG. 4 is an enlarged cross-sectional view taken substantially along line 4—4 of FIG. 1.
Figures 5, 6:
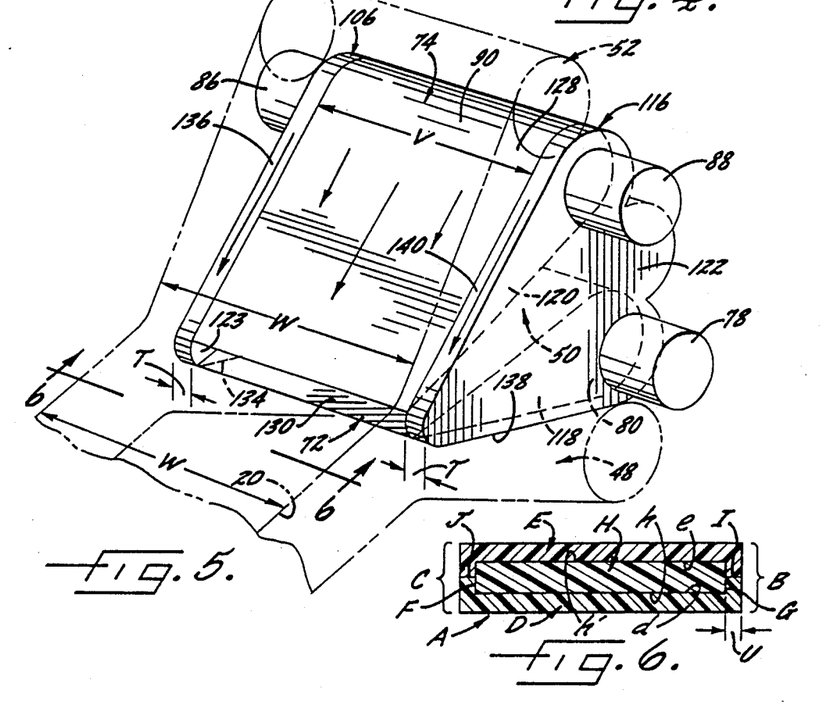
FIG. 5 is an enlarged perspective view of the flow-combining elements of FIG. 2, with retention plate thickness exaggerated and the distribution pins removed for clarity.
FIG. 6 is a section of a laminate as viewed along line 6—6 of FIG. 5.

Referring to FIGS. 4 and 5, flow channel 52 has a width W identical to that of passage 20. Inner walls 68,70 of housing plugs 34,36 define the flow channel width. Likewise, flow channel 48 has a width W, defined by inner walls 68,70.

Pivotably mounted between flow channels 48 and 50, and between flow channels 50 and 52 are adjustable vane blades 72,74, respectively, for variably adjusting flow. Each blade has a width "V", which is less than "W".

Adjustability of vane blades 72,74 is provided as now described. As shown, round shafts 76,78 at each end of a head portion 80 of vane blade 72 are supported by bearing surfaces 82,84 in housing plugs 34,36, and round shafts 86,88 at each end of a head portion 90 of blade 74 are supported by bearing surfaces 92,94 in the housing plugs. Shafts 76,86 are notched for radial adjustment of point portions or ends 96,98, shown in FIG. 3, of blades 72,74, respectively. Housing plug 34 includes openings 100 for providing access to the notched shafts.

With reference again to FIG. 3, near point ends 96,98 of the vane blades are adjustable distribution pins 102,103, which typically include elongated grooves 104,105, best seen in FIG. 2. Pins 102,103 serve flow channels 48,52, respectively. Cooperation of a distribution pin with the adjacent point portion of a vane blade, provides, if needed, for the profiling of a stream as it exits from its flow channel.

Referring also to FIG. 4, mounted on shafts 76,86 of the vane blades is a generally heart-shaped, retention plate 106 having a thickness T and, as shown in FIG. 2, apertures 108,110. As can be seen in FIG. 3, the length of retention plate 106 is such that vane blade ends 112,114 are completely covered by the plate. More precisely, when measured from the axis of a vane blade, the length of the plate equals the length of the vane blade.

With reference to FIGS. 4 and 5, a retention plate 116 of the same heart-shaped configuration and dimensions including thickness T, as retention plate 106, is mounted on shafts 78,88 of the vane blades. As can be seen in FIG. 5, retention plate 116 completely covers vane blade ends 118,120.

As retention plate 116 functions separately from retention plate 106, retention plate 116 could have a thickness greater or lesser than thickness T of retention plate 106. In fact, retention plate 116 could even have a different length, or not be used altogether.

With reference to FIG. 4, portion 117,117' of retention plate 106 are disposed between housing plug 34 and vane blade ends 112,114, and retention plate 116 likewise has portions situated between housing plug 36 and vane blade ends 118,120. Advantageously, as shown, outer wall surfaces 121,122 of the retention plates are in contact with inner walls 68,70 of the respective housing plugs, and inner wall surfaces 123,124 of the plates are in contact with the respective vane blade ends. As a result, as shown in FIGS. 4 and 5, width V of vane blade 74 plus thicknesses T,T of retention plates 106,116 equals width W of flow channel 52. Likewise, width V of vane blade 72 plus thicknesses T,T of the retention plates equals width W of flow channel 48.

As can be seen in FIG. 4, an inner wall 123 of retention plate 106 defines an end of flow channel 50, and an inner wall 124 of retention plate 116 defines the other end of the flow channel. Accordingly, flow channel 50 has a width less than the width of flow channel 48, and likewise less than the width of flow channel 52. Conveniently, flow channel 50 has a width V equal to width V of either vane blade.

As a result of the foregoing features of my coextrusion apparatus, the widthwise flow of a stream in flow channel 50 is limited by retention plates 106,116; whereas, streams in adjoining channels 48,52 flow to a comparatively greater width. Thereafter, upon convergence of the streams, the widthwise flow of the retained stream is limited by flow of the other streams.

The result, as shown in FIG. 6, is a composite sandwich A having isolating edges B,C formed by streams D,E from flow channels 48,52, respectively. The isolating edges prevent ends F,G of a retaind stream H from extending to the full laminate width. Faces h,h' of the retained stream H are shown in contact with faces d,e of streams D,E, respectively.

Isolating edge B has a width U, which is the same as that of isolating edge C. As explained below, width U is less than thickness T of retention plate 116. Isolating edges B,C include edge seams I,J, respectively, formed by converging streams D,E. The edge seams are formed at locus of convergence 66.

A composite sandwich similar to that of FIG. 6, can be made using the die-in-a-feedblock apparatus described earlier. However, in addition to other limitations, that coextrusion apparatus requires a dedicated flow passage.

As will be explained in detail below, by the use of interchangeable plates, my invention is capable of producing a laminate in which any selected layer or layers extend less than the full width of a laminate. In other words, my invention is capable of, for instance with reference to FIG. 6, preventing skin layers D,E from extending the full width, while allowing core layer H to extend the full width, and even of preventing a skin layer and core layer H from extending the full width, while permitting the other skin layer to extend the full width.

An advantageous feature of my invention is a composite structure that includes an isolating edge which is formed by and integral with a stream forming the composite structure. Such an edge is beneficial forming for example, a laminate useful for biaxial orientation. In comparison, an edge seam of an edge-laminated composite formed by, for instance, the apparatus of the Nissel patent, could separate during the stress of the stretching process.

Moreover, I have discovered that my coextrusion apparatus advantageously enables isolating edge widths to be increased or decreased, as desired, by mere adjustment of the point ends of the vane blades. I now set forth my theory explaining this highly useful discovery.

Figure 7:
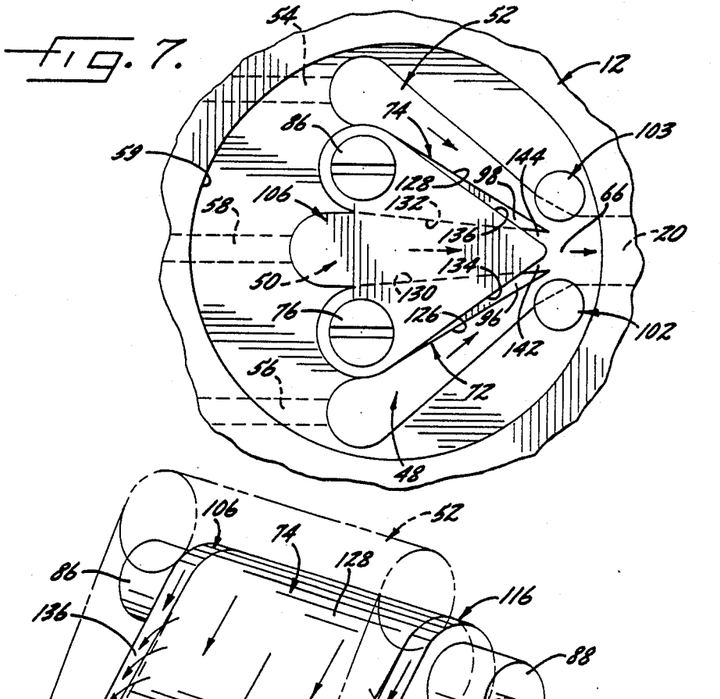
FIG. 7 is a plan view similar to that of FIG. 3, with point ends 96,98 of vane blades 72,74 shown rotated toward distribution pins 102,103 compared to FIG. 3.

Referring to FIG. 7, point ends 96,98 of vane blades 72,74 are shown rotated toward distribution pins 102,103. As a consequence, referring now also to FIG. 8, there is, compared to the flow in FIGS. 3 and 5, a more restricted flow across vane faces 126,128 of channels 48,52, and inversely a less restricted flow across vane faces 130,132 of channel 50.

Figures 8, 9:
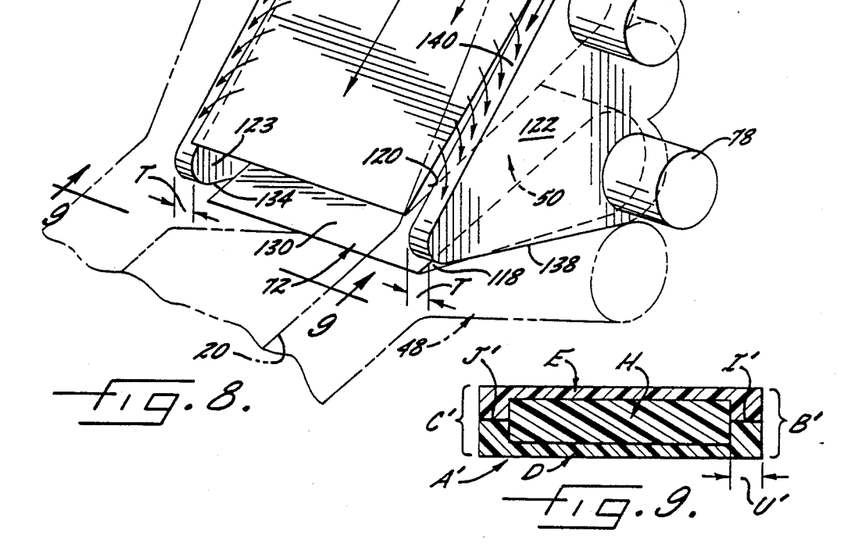
FIG. 8 is an enlarged perspective view similar to that of FIG. 5, with the vane blade point ends positioned as shown in FIG. 7.
FIG. 9 is a section of a laminate as viewed along line 9—9 of FIG. 8.

With continued reference to FIG. 8, in channels 48,52, the excess flow takes the path of least resistance, which is along edges 134,136 of retention plate 106 and along edges 138,140 of retention plate 116. Convergence of each side stream with the stream in channel 50 occurs at loci 142,144, shown in FIG. 7. As a result, each side stream limits the widthwise flow of the stream in channel 50.

A relatively lower back pressure in channel 50 due to less restricted flow through channel 50, combined with a relatively increased back pressure in channels 48,52 causes the excess flow to pass from channels 48,52 into channel 50. The result, as shown in FIG. 9, is a laminate A' having isolating edges B',C' of greater width than thickness T, and therefore also of greater width than edges B,C of the Figure 6 laminate. It will be, of course, understood that the foregoing comparison between the laminates of FIGS. 6 and 9 is based upon volumetric output being constant from one case to the other.

Width U' of isolating edge B' is the same as that of isolating edge C'. Loci 142,144 are upstream of locus of convergence 66, at which, similar to FIG. 3, composite A' and edge seams I',J' are simultaneously formed.

When the relative back pressures in the manifolds are equal, an isolating edge width equals the retention plate thickness. In FIGS. 3 and 5, the relative back pressures are such that isolating edge width U of laminate A of FIG. 6 is less than thickness T of retention plate 116; whereas, as described for FIGS. 7 and 8, the relative back pressures are such that isolating edge width U' of laminate A' of FIG. 9 is greater than thickness T of retention plate 116. Therefore, there exists a position for each of the vane blade point ends between the positions shown in FIGS. 3 and 7, that will produce, if such is desired, an isolating edge width equal to the retention plate thickness. More specifically, if blade point ends 96,98 were positioned to provide an exit orifice from each flow channel equal to one-third of the area of locus of convergence 66, there would be obtained an isolating edge width equal to the retention plate thickness.

It should, however, be understood that in my invention, factors such as the relative viscosities of the converging streams and relative channel throughput, affect the back pressure. Therefore, a fixed position for each blade point end may not yield a constant isolating edge width from case to case. Due to the importance of the viscosity factor, it may be necessary to make vane blade adjustments before a desired isolating edge width is obtained.

It will, of course, be understood that in my invention, the vane blade point ends will both be set in the same position relative to the respective distribution pins, in order to provide an isolating edge of uniform width from side to side.

If desired, the blade point ends may be positioned closer to the distribution pins than is shown in FIG. 7, and may even touch the distribution pins. The result, of course, would be isolating edges of even greater width than is shown in FIG. 9. Accordingly, by mere adjustment of the blade point ends, an isolating edge can be given any desired width between width U of FIG. 6, which is produced by the position shown in FIG. 3, and the width produced by a position in which the point ends touch the distribution pins.

However, due to, for instance, the relative viscosities of the converging streams or the isolating edge width desired, more than mere adjustment of the vane blades may be necessary. To solve a difficult and complex situation of this type, I have discovered that short retention plates, that is, retention plates of insufficient length to completely cover vane blade ends 112,114,118,120, may be substituted for plates 106,116.

Beneficially, plates 106,116 are easily replaced. First, housing plug 34 is removed, an appropriate short plate is exchanged for plate 106, and the housing plug is put back in place. Then, the procedure is repeated with housing plug 36, with a second short plate being substituted for plate 116.

FIGS. 10-13 illustrate a second embodiment of my invention, in which a pair of identical short plates are employed in place of retention plates 106,116.

Figures 10, 11, 12, 13:
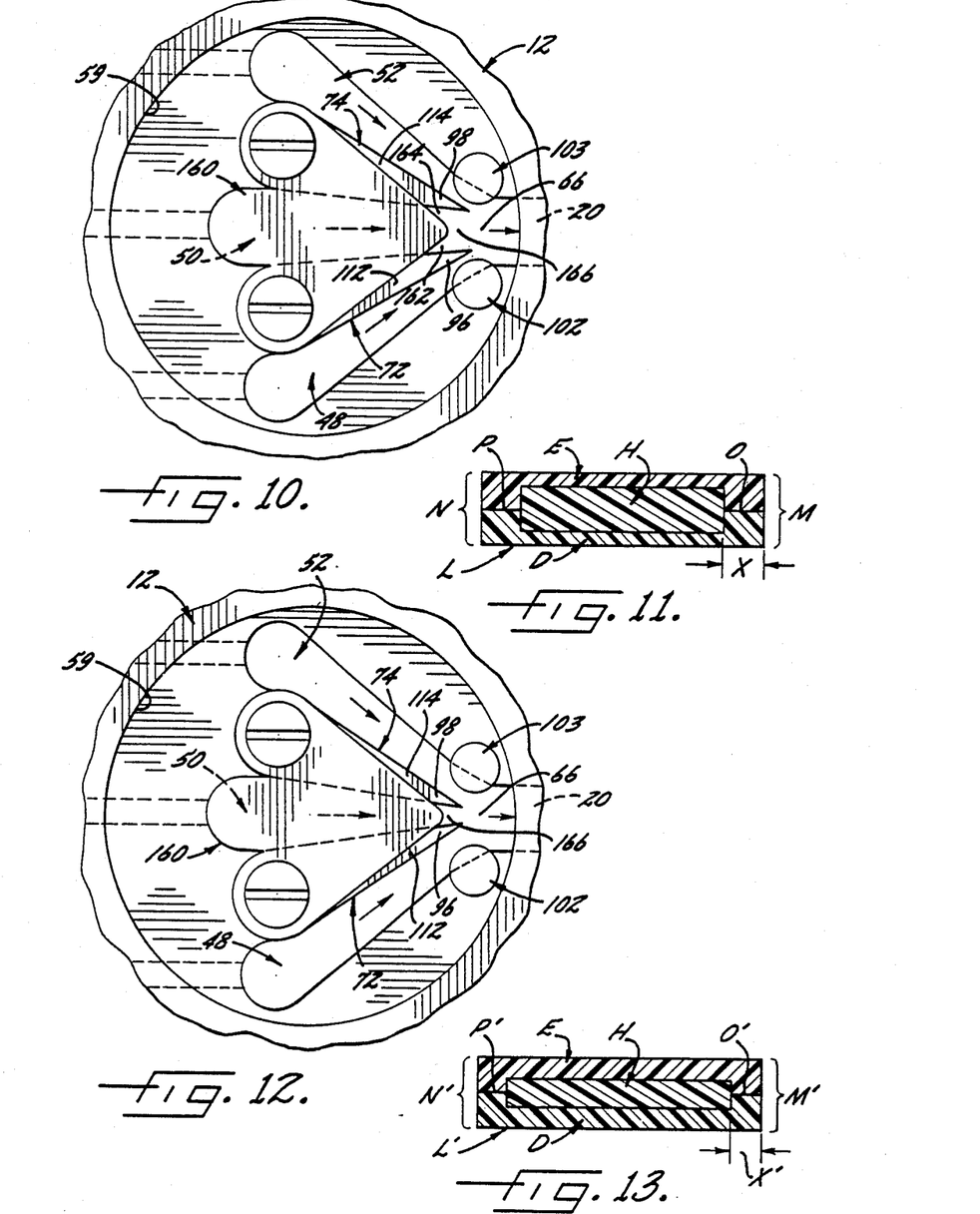
FIG. 10 is a plan view similar to that of FIG. 7, of a second embodiment of a coextrusion apparatus in accordance with the present invention, in which the retention plates of the first embodiment are replaced by a pair of short retention plates only one of which is shown.
FIG. 11 is a view similar to that of FIG. 9, of a laminate L, according to a second embodiment of the invention as shown in FIG. 10.
FIG. 12 is a plan view similar to that of FIG. 10, of a second embodiment of the invention, with the vane blade point ends shown rotated away from distribution pins 102,103 compared to FIG. 10.
FIG. 13 is a view similar to that of FIG. 9, of a laminate L', according to a second embodiment of the invention as shown in FIG. 12.

Referring to FIG. 10, in which only a single short retention plate 160 is shown, vane blades 72,74 remain positioned as in FIG. 7. Convergence of streams from channels 48,52 with the stream in channel 50 occurs at loci 162,164. As a result, the widthwise flow of the stream in channel 50 is limited.

Loci 162,164 are upstream of convergence place 166, at which isolating edges M,N, shown in FIG. 11, are formed. Convergence place 166 is itself upstream of locus of convergence 66, at which a laminate L, shown in Figure 11, is formed. Thus, it may be understood that use of a short plate results in isolating edge formation prior to the formation of the three-layer laminate in the combined flow passage.

With reference to FIG. 11, comparison of a width X of isolating edge M of laminate L with the isolating edge width of laminate A', shown in FIG. 9, reveals that laminate L has a greater isolating edge width. Isolating edge N of laminate L also has width X.

Referring to FIG. 12, in which vane blade point ends 96,98 are shown rotated further away from distribution pins 102,103 compared to FIG. 10, laminate L', shown in FIG. 13, has an isolating edge width X' about equal to the isolating edge width of laminate A' of FIG. 9. However, the point ends of the vane blades are much closer together in FIG. 12 than in FIG. 7. Moreover, comparison of the laminates of FIGS. 9 and 13 reveals that the present invention provides for varying layer thickness, yet maintaining a desired isolating edge width. It will be, of course, understood that the foregoing comparisons between the first and second embodiments of my invention are based upon volumetric output being constant from one embodiment to the other.

In my invention, isolating edge widths may be increased or decreased by mere adjustment of the vane blade point ends. The relative viscosities of the converging streams affect the back pressure and the isolating edge widths.

If, due to, for instance, the relative viscosities of the converging streams or the edge width desired, a desired isolating edge width may not be obtained using short retention plates, the present invention provides for the use of retention plates of thickness greater than T and of vane blades of less width than width V, in place of the retention plates and vane blades 72,74 of the first and second embodiments. However, it will be appreciated that there is a substantial economic drawback to replacing the vane blades.

The procedure for replacing the vane blades and retention plates is easy. Suitably, a procedure identical to that described for replacing only the retention plates may be followed, except that the vane blades are also removed and replaced at the time of replacing the first retention plate.

In addition to the foregoing flexibility in obtaining a desired isolating edge width, my invention is able, by the use of interchangeable plates, to produce a composite in which any selected layer or layers extend less than the full width of the composite. This feature of my invention is illustrated by FIGS. 14-17, for a three layer composite.

Figures 14, 15:
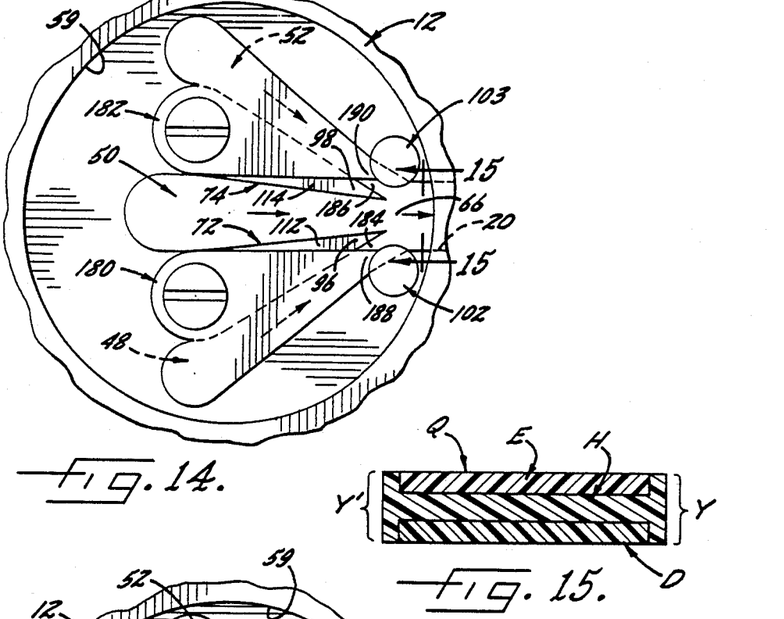
FIG. 14 is a plan view similar to that of FIG. 7, of a third embodiment of a coextrusion apparatus in accordance with the present invention, in which each retention plate of the first embodiment is replaced by a pair of retention plates (only one pair shown)
FIG. 15 is a diagrammatic cross-sectional view of a laminate taken substantially along line 15—15 of FIG. 14.

FIG. 14 illustrates a third embodiment of my invention, in which each retention plate of the first embodiment is replaced by a pair of plates. However, only one pair of plates, that is, plates 180,182, is shown. It will therefore be understood that plates identical to plates 180,182 are employed in place of retention plate 116.

As can be understood from FIG. 14, these substitute plates limit the widthwise flow of streams in flow channels 48,52; whereas, a stream in flow channel 50 is permitted to flow to a width equal to that of combined flow passage 20. In short, this embodiment provides for flow channel widths that are the reverse of the first embodiment of the present invention.

With continued reference to FIG. 14, convergence of the core stream with the streams in channels 48,52 occurs at loci 184,186. As a result, widthwise flow of the streams in channels 48,52 is limited by the flow of the core stream, and isolating edges Y,Y', shown in FIG. 15, are formed. Loci 184,186 are upstream of locus of convergence 66, at which a three layer composite structure Q, shown in Figure 15, is formed. Thus, isolating edges Y,Y' are formed upstream of locus of convergence 66. Plate tips 188,190 are in contact with distribution pins 102,103.

Composite structure Q includes a core stream H, which forms the isolating edges. Streams D,E extend less than the full composite width. Isolating edge Y has the same width as edge Y'.

Structure Q is especially useful when forming a biaxially-oriented laminate having heat-sealable skin layers. Isolating edges Y,Y' protect the ends of the skin layers from metal clips used for biaxial orientation; otherwise, the skin layer ends could adhere to the clips.

Figures 16, 17:
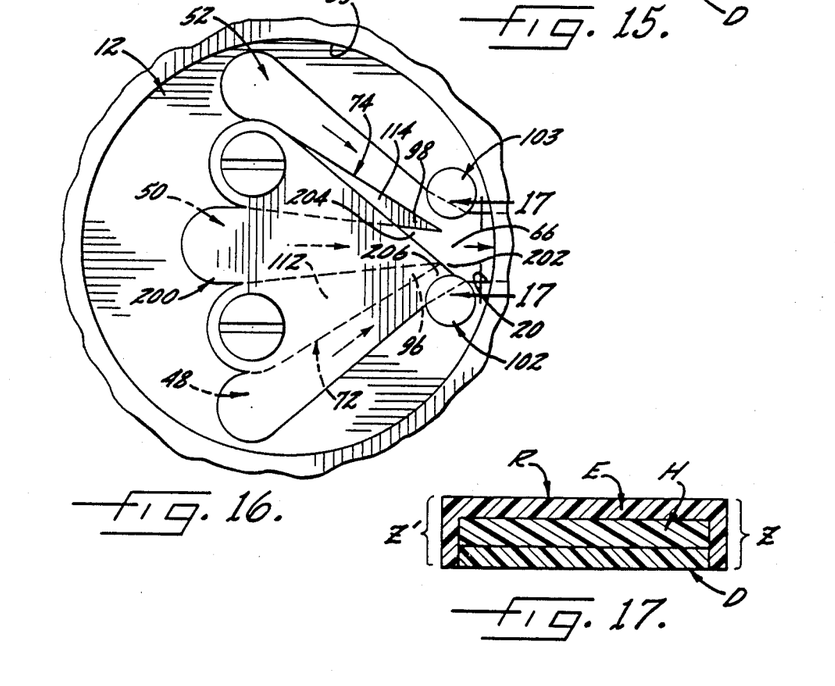
FIG. 16 is a plan view similar to that of FIG. 7, of a fourth embodiment of a coextrusion apparatus in accordance with the present invention, in which the retention plates of the first embodiment are replaced by a pair of retention plates only one of which is shown.
FIG. 17 is a diagrammatic cross-sectional view of a laminate taken substantially along line 17—17 of FIG. 16.

FIG. 16 illustrates a fourth embodiment of my invention, in which another pair of identical plates are employed in place of retention plates 106,116.

As can be understood from FIG. 16, in which retention plate 200 is shown, these substitute plates limit the widthwise flow of streams in flow channels 48,50; whereas, a stream in flow channel 52 is permitted to flow to a width equal to that of combined flow passage 20. Thus, this embodiment provides a composite structure in which the core layer and a skin layer are prevented from extending to the full composite width by isolating edges formed by the other skin layer.

With continued reference to FIG. 16 convergence of a stream from channel 52 with the streams in channels 50,48 occurs at loci 204,202, respectively. As a result, the flow of the stream from channel 52 limits the widthwise flow of the streams in channels 50,48. Loci 202,204 are upstream of locus of convergence 66, at which a three layer composite structure R, shown in FIG. 16, is formed. Plate tip 206 is in contact with distribution pin 102.

Heretofore unobtainable, composite structure R includes a side stream E, which forms isolating edges Z,Z'. Streams H,D extend less than the full composite width. Isolating edge Z is of the same width as edge Z'.

As shown by the composite structures of FIGS. 6, 15 and 17, my invention makes it possible to selectively prevent the ends of a core layer, the ends of both skin layers, or the ends of a core layer and a single skin layer from extending to the full composite width. The use of an appropriate set of interchangeable retention plates makes possible this highly desired flexibility.

As a result of the foregoing features of my coextrusion apparatus, the widthwise flow of a stream in a flow channel is limited by a retention plate; whereas, a stream in another channel flows to a comparatively greater width. Thereafter, upon convergence of the streams, the widthwise flow of the retained stream is limited by flow of the second stream. The result is a laminate in which the retained stream is prevented from extending to the full laminate width by an isolating edge formed by the second stream.

If desired, my invention is able to produce a laminate having isolating edges of different thicknesses or even different edge configurations. Such a result may be easily obtained by, for instance, substituting retention plate 160 for retention plate 106, but leaving retention plate 116 in place (different thicknesses); or by substituting retention plate 200 for retention plate 106, but leaving retention plate 116 in place (different edge configurations).

A further benefit of my invention is that the retention plates may advantageously influence stream profile based upon pressure displacement.

Operation of coextrusion apparatus 10, shown in FIGS. 1-5, 7 and 8, will now be described. Vane blades 72,74 each having a width V of 3.8" and retention plates 106,116 each having a thickness T of 0.1" are selected for use and inserted into feedblock 12, which has a width W of 4" for flow channels 48,50,52 and flow passage 20. The resultant feedblock has a width V of 3.8" for flow channel 50, with the other flow channels and flow passage 20 remaining 4" wide.

Vane blade point ends 96,98 are adjusted to provide at locus of convergence 66, a laminate having a pair of isolating edges of 0.1" width. As explained earlier, the exact location of the point ends will vary depending upon the relative viscosities of the converging streams.

The laminate formed at locus of convergence 66 is passed into die 14, which has a manifold 26 of 40" width, thereby providing a 10:1 spread ratio (40"/4"). In the manifold, transverse flow occurs to produce a laminate having isolating edges each of 1" width. Thus, the laminate product that exits from the die is 40" wide and has a pair of 1" wide isolating edges.

When my invention is applied to a laminate of five or more layers, heretofore unobtainable composite structures are produced. FIG. 19 exemplifies one such composite structure, formed by the use of an identical pair of upstream retention plates and two sets of identical downstream retention plates in the feedblock of FIG. 18.

Figure 18:
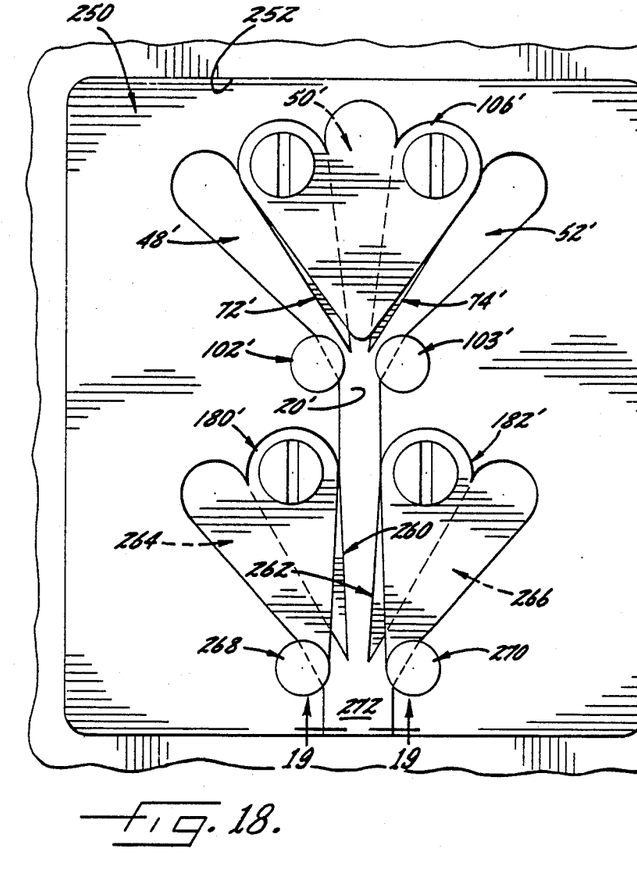
FIG. 18 is a plan view of yet another embodiment, in which a dual plane feedblock 250 is used in place of feedblock 12, with similar to FIG. 3 only the housing plug recess area of the feedblock shown.
Figure 19:
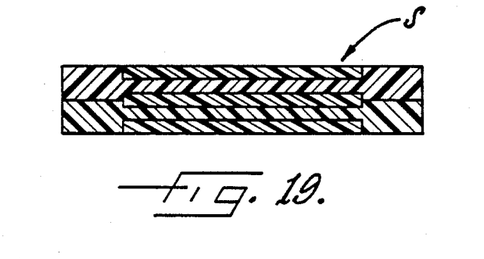
FIG. 19 is a diagrammatic cross-sectional view of a five layer laminate taken substantially along line 19—19 of FIG. 18.

Referring to FIG. 18, the housing plug recess area of a dual plane feedblock 250, which has a housing plug recess 252, is shown. Feedblock 250 includes flow channels 48',50',52', a combined flow passage 20', vane blades 72',74', a pair of upstream retention plates (only 106' shown), and distribution pins 102',103', all of which parts are similar to those of the first embodiment of my invention. However, in addition, feedblock 250 includes a pair of downstream vane blades 260,262 pivotably mounted between a flow channel 264 and flow passage 20', and between flow passage 20' and a flow channel 266, respectively; two sets of downstream retention plates (only one set shown, these being plates 180',182'); distribution pins 268,270; and an exit channel 272.

A five layer composite structure S, shown in FIG. 19 is produced. The first, third and fifth layers of the composite extend less than the full composite width. Conversely, if a five layer composite structure in which the second and fourth layers extend less than the full composite width were desired, this structure may be obtained in accordance with my invention as follows: the downstream retention plates of FIG. 18 are substituted for the upstream retention plates of FIG. 18, the downstream vane blades are replaced by full width vane blades, and no retention plates are used downstream.

Figure 21:
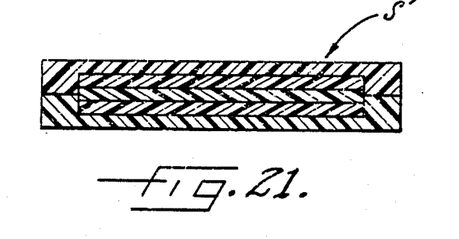
FIG. 21 is a diagrammatic cross-sectional view of a five layer laminate taken substantially along line 21—21 of FIG. 20.

FIG. 21 shows another novel five layer composite structure S', which may be produced by a coextrusion apparatus in accordance with the present invention. Such a composite structure is formed by employing a pair of identical retention plates in place of the plates shown in FIG. 18.

Figure 20:
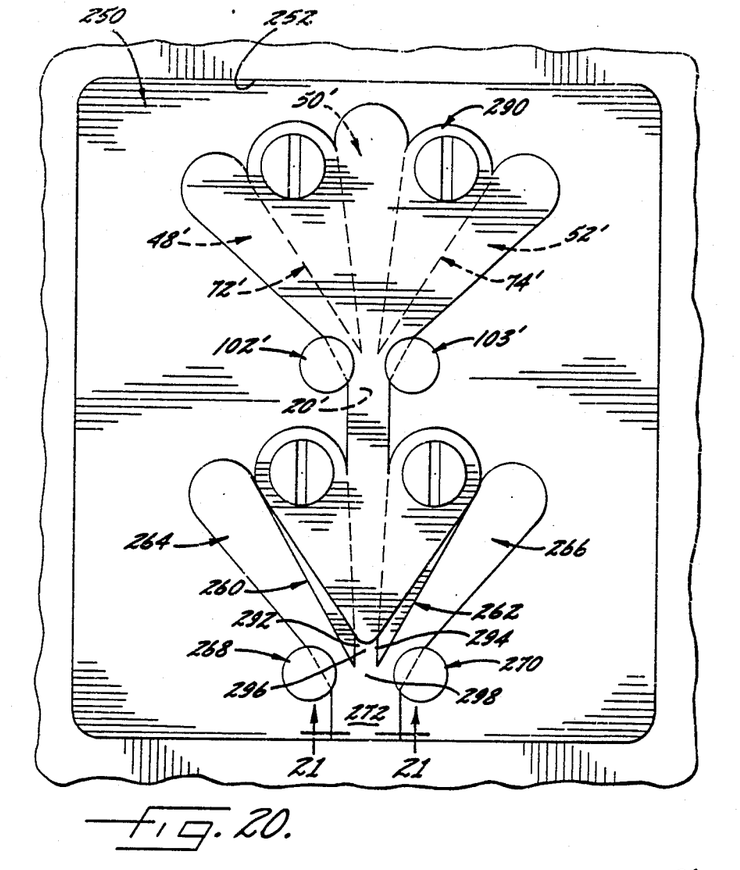
FIG. 20 is a plan view similar to that of Figure 18, of another embodiment, in which the retention plates of the embodiment of FIG. 18 are replaced by a pair of retention plates only one of which is shown.

Referring to FIG. 20, in which only a retention plate 290 is shown, streams from flow channels 48',50',52' converge in combined flow passage 20' to form a three layer composite stream. Thereafter, similar to FIG. 10, streams from flow channels 264,266 converge with the composite stream at loci 292,294. As a result, the widthwise flow of the composite stream in flow passage 20' is limited.

Loci 292,294 are upstream of place of convergence 296. Convergence place 296 is itself upstream of locus of convergence 298, at which a laminate having composite structure S' is formed. The second, third and fourth layers of the composite structure extend less than the full laminate width.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

INDUSTRIAL APPLICABILITY

The extrusion apparatus of this invention is useful for selectively preventing any layer or layers of a laminate from extending to the edge of the laminate.

I claim:

1. A coextrusion apparatus comprising a first row channel having a width equal to that of a combined flow passage formed by the convergence of said first flow channel and a second flow channel of less width than said first flow channel; adjustable divider means separating said first flow channel and said second flow channel, the divider means having a width less than that of said first flow channel; and removably mounted, flow channel width-limiting means having an inner wall defining an end of said second flow channel.

2. The coextrusion apparatus of claim 1, further comprising a second adjustable divider means and a third flow channel; the second divider means separating said second flow channel and said third flow channel, and having a width equal to that of said first divider means, and said combined flow passage being formed by the convergence of said first flow channel, said second flow channel and said third flow channel.

3. The coextrusion apparatus of claim 2, wherein said third flow channel has a width equal to that of said first flow channel.

4. The coextrusion apparatus of claim 2, wherein said third flow channel has a width equal to that of said second flow channel, said inner wall of said flow channel width-limiting means defining an end of said third flow channel.

5. The coextrusion apparatus of claim 1, further comprising a second adjustable divider means, a third flow channel of less width than said first flow channel, and a second removably mounted, flow channel width-limiting means; the adjustable divider means separating said first flow channel and said third flow channel, and having a width less than that of said first flow channel, said second removably mounted, flow channel width-limiting means limiting said third flow channel to a width less than that of said first flow channel, and said combined flow passage being formed by the convergence of said third flow channel, said first flow channel and said second flow channel.

6. The coextrusion apparatus of claim 1, wherein said divider means is removably mounted.

7. The coextrusion apparatus of claim 1, wherein a portion of said flow channel width-limiting means is disposed between an end of said divider means and an inner wall of said coextrusion apparatus.

8. The coextrusion apparatus of claim 7, wherein said flow channel width-limiting means is a retention plate of length sufficient to fully cover said end of said divider means.

9. The coextrusion apparatus of claim 7, wherein said flow channel width-limiting means is a retention plate of insufficient length to fully cover said end of said divider means.

10. The coextrusion apparatus of claim 1, wherein said width of said second flow channel and said divider means width are identical.

11. The coextrusion apparatus of claim 1, wherein said flow channel width-limiting means is of uniform thickness.

12. The coextrusion apparatus of claim 1, wherein said flow channel width-limiting means has a thickness equal to the difference between said width of said first flow channel and said width of said divider means.

13. A coextrusion apparatus comprising a first flow channel having a width equal to that of a combined flow passage formed by the convergence of said first flow channel and a second flow channel of less width than said first flow channel; adjustable divider means separating said first flow channel and said second flow channel, the divider means being removably mounted and having a width less than that of said first flow channel; and removably mounted, flow channel width-limiting means having an inner wall defining an end of said second flow channel, said flow channel width-limiting means being of uniform thickness equal to the difference between said width of said first flow channel and said width of said divider means, a portion of said flow channel width-limiting means being disposed between an end of said divider means and an inner wall of said coextrusion apparatus.

14. A process for adjusting the width of an isolating edge of a laminate, said process comprising adjusting the relative back pressures in adjacent flow channels by the movement of adjustable divider means separating said adjacent flow channels; allowing a first stream to flow transversely to a certain width in one of said adjacent flow channels; permitting a second stream to flow transversely to a width less than said certain width in the other of said adjacent flow channels; and thereafter limiting the widthwise flow of said second stream by the convergence of said first stream and said second stream, whereby an isolating edge preventing said second stream from extending to the full laminate width is formed;

a laminate having an isolating edge of a selected width thereby being formed.

15. A process for forming a laminate, said process comprising allowing a first stream to flow transversely to a certain width; permitting a second stream to flow transversely to a width less than said certain width; thereafter upstream of a locus of convergence at which the faces of said streams converge, limiting the widthwise flow of said second stream by the convergence of said first stream and said second stream; and then converging said first stream and second stream faces, whereby said first stream forms an isolating edge that prevents said second stream from extending to the full laminate width.

* * * * *